United States Patent [19]
Freedland

[11] Patent Number: 6,148,175
[45] Date of Patent: Nov. 14, 2000

[54] AUDIO ENTERTAINMENT SYSTEM

[76] Inventor: Marat Freedland, 6814 Maurleen Rd., Baltimore, Md. 21209

[21] Appl. No.: 09/337,642

[22] Filed: Jun. 22, 1999

[51] Int. Cl.[7] .............................. H04H 1/00; H04M 1/00; H03G 3/00

[52] U.S. Cl. ............................ 455/3.1; 455/6.1; 455/6.3; 379/430; 380/9; 381/64

[58] Field of Search .............................. 455/3.1, 6.1, 6.3, 455/90; 704/278, 270; 381/61; 379/430; 380/9

[56] References Cited

U.S. PATENT DOCUMENTS

| | | |
|---|---|---|
| 4,152,553 | 5/1979 | White . |
| 4,195,202 | 3/1980 | McCalmont . |
| 4,400,591 | 8/1983 | Jennings et al. . |
| 4,652,699 | 3/1987 | Akaiwa . |
| 4,683,586 | 7/1987 | Sakamoto et al. . |
| 4,683,588 | 7/1987 | Goldberg . |
| 4,790,009 | 12/1988 | Ishigaki et al. . |
| 4,823,380 | 4/1989 | Kohen et al. . |
| 4,882,745 | 11/1989 | Silver ........................................ 455/90 |
| 4,903,298 | 2/1990 | Cline . |
| 4,949,378 | 8/1990 | Mammone . |
| 5,091,941 | 2/1992 | Needle et al. . |
| 5,113,428 | 5/1992 | Fitzgerald ................................. 455/90 |
| 5,327,521 | 7/1994 | Savic et al. ............................ 395/2.81 |
| 5,353,378 | 10/1994 | Hoffman et al. . |
| 5,438,702 | 8/1995 | Jackson ..................................... 455/89 |
| 5,559,792 | 9/1996 | Bottoms et al. .......................... 370/20 |
| 5,596,638 | 1/1997 | Paterson et al. ........................ 379/430 |
| 5,615,410 | 3/1997 | DeMars ..................................... 455/90 |
| 5,621,182 | 4/1997 | Matsumoto ............................... 84/610 |
| 5,641,926 | 6/1997 | Gibson et al. ............................ 84/603 |
| 5,765,134 | 6/1998 | Kehoe ..................................... 704/270 |

*Primary Examiner*—Nathan Flynn
*Assistant Examiner*—Kieu-Oanh Bui
*Attorney, Agent, or Firm*—Rosenberg, Klein & Lee

[57] ABSTRACT

An entertainment system (100, 100', 100") is provided which includes a plurality of remote stations (110, 110'). Each of the remote stations includes a microphone (118), a transmit section (112*b*), a receive section (112*a*) and at least one audio transducer (116) coupled to the output of the receive section. Signals output from each of the remote stations are received by a respective reception channel (134) of a signal distribution unit (130, 130', 130", 130'"). The received signals are combined and output to each of the remote stations. The audio signals received by the remote stations are altered, utilizing one or more sound effects processors (138) located in the signal distribution unit, or a respective sound effects processor (122) incorporated into each of the remote stations.

17 Claims, 5 Drawing Sheets

AUDIO ENTERTAINMENT SYSTEM

BACKGROUND OF THE INVENTION

1. Field of the Invention

This invention directs itself to an entertainment system. More particularly, this invention pertains to an entertainment system which provides audio communications between a plurality of participants utilizing audio signals that have been altered in predetermined fashions. Further, the audio communications between participants is arranged into one or more chat rooms wherein the participants' voices may be commonly altered by a single sound effects processor, or altered individually or in various groupings of signals from particular remote stations. Still further, the present invention directs itself to an entertainment system providing altered voice communications between participants in coordination with preprogrammed material. The preprogrammed material may include audio and/or video program material with which the sound effects are coordinated.

2. Prior Art

Systems for altering the voice of a person are well known in the art. Such systems are utilized in conjunction with alteration of musical productions, telephone and broadcast systems. The best prior art known to the Application includes U.S. Pat. Nos. 5,765,134; 4,949,378; 4,152,553; 4,400,591; 4,683,588; 4,903,298; 4,195,202; 4,790,009; 4,683,586; 4,652,699; 5,353,378; 5,327,521; 4,823,380; 5,641,926; and, 5,091,941. Such systems do not provide the ability to create a "chat room" environment, with the participants' voices being altered, either in a common fashion or individually.

SUMMARY OF THE INVENTION

An entertainment system for audio communication between a plurality of participants is provided. The entertainment system includes a plurality of remote stations and a signal distribution unit. Each of the remote stations includes (a) a microphone, (b) a transmit section having an input coupled to the microphone for transmission of audio signals input thereto, (c) a receive section, and (d) at least one audio transducer coupled to an output of the receive section for providing an aural output. The signal distribution unit has a plurality of reception channels for receiving the transmission of audio signals from each of the plurality of remote stations. The signal distribution unit includes at least one sound effects processor for altering respective audio signals from at least one of the plurality of remote stations and a transmission circuit coupled to an output of the sound effects processor for output of the altered audio signals to the remote stations.

From another aspect, an entertainment system for audio communication between a plurality of participants is provided with a plurality of remote stations and a signal distribution unit. Each of the remote stations includes (a) a microphone, (b) a sound effects processor having an input coupled to the microphone for altering audio signals input thereto, (c) a transmit section having an input coupled to an output of the sound effects processor for transmission of the altered audio signals, (d) a receive section, and (e) at least one audio transducer coupled to an output of the receive section for providing an aural output. The signal distribution unit has a plurality of reception channels for receiving the transmission of altered audio signals from each of the plurality of remote stations. The signal distribution unit also has a transmission circuit coupled to the plurality of reception channels for communication of the altered audio signals to the remote stations.

From yet another aspect, an entertainment system for audio communications between a plurality of participants is provided which includes a plurality of remote stations and an audio alteration unit. Each of the remote stations includes a microphone, a transmit section having an input coupled to the microphone for transmission of audio signals input thereto, a receive section, and at least one audio transducer coupled to an output of the receive section. The audio alteration unit includes a plurality of discrete reception channels for receiving the transmission of audio signals from each of the plurality of remote stations. The audio alteration unit also includes at least one sound effects processor for altering respective audio signals from at least one of the remote stations. A source of prerecorded control signals is also provided as part of the audio alteration unit. A decoder is provided having an input coupled to an output of the source of pre-stored control signals and an output coupled to a control input of the sound effects processor for varying alteration of audio signals coupled to the sound effects processor responsive to the pre-stored control signals. The audio alteration unit includes at least one audio transmission circuit coupled to the sound effects processor for output of the altered audio signals to the remote stations. The source of pre-stored control signals may include a source of video signals, as well.

DESCRIPTION OF THE PREFERRED EMBODIMENTS

Referring now to FIGS. 1–5, there is shown, entertainment system 100, 100', 100" for providing entertainment in the form of audio communication between a plurality of participants utilizing audio signals that have been altered in predetermined fashions. As will be seen in following paragraphs, entertainment system, 100, 100', 100" is specifically directed to the concept of establishing one or more "chat rooms" wherein the audio signals representing the voices of the participants are altered to provide amusing effects.

The term "chat room" is typically defined as a system for informal communication among users of the Internet. The chat feature allows two or more people to converse by sending text messages back and forth through the "chat room" that is accessed via a server of an on-line service. Only those connected to the server can participate in the chat.

Figure 3:
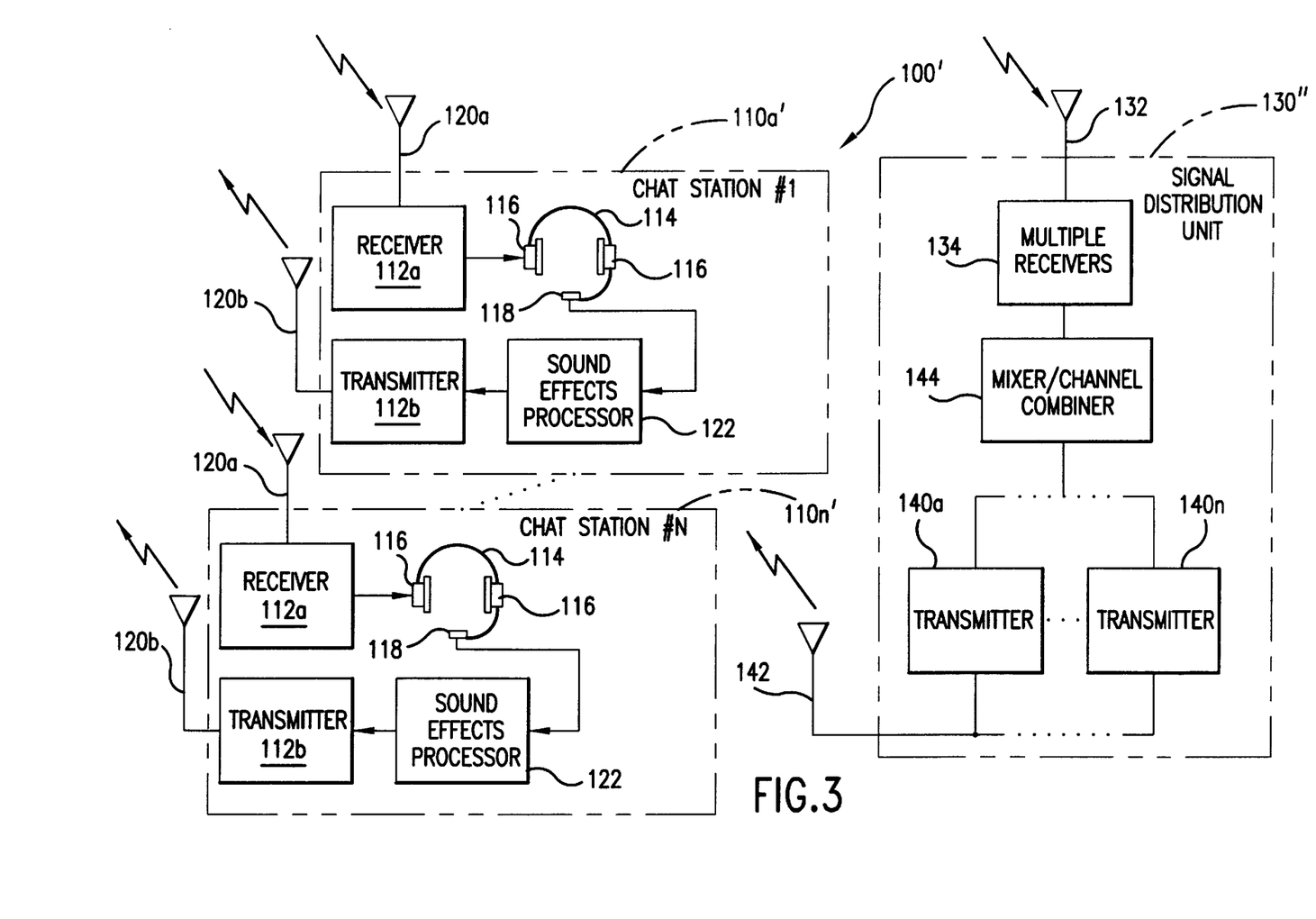
FIG. 3 is a schematic block diagram of an alternative configuration of the present invention.

System 100, 100', 100" differs form the Internet based chat system in several respects. First, system 100, 100', 100" provides audio communications between the multiplicity of participants using the system. Obviously, system 100, 100', 100" does not require the use of the Internet, although such could be utilized as the signal distribution unit 130" (FIG. 3). The participants can be physically co-located in a common space, or located in diverse locations and coupled to the signal distribution unit 130, 130', 130", 130'" through a telephone network. Of most importance, system 100, 100', 100" provides an audio chat room wherein the audio signals from each of the participants is altered to provide interesting changes to the participants' voices.

Figure 1:
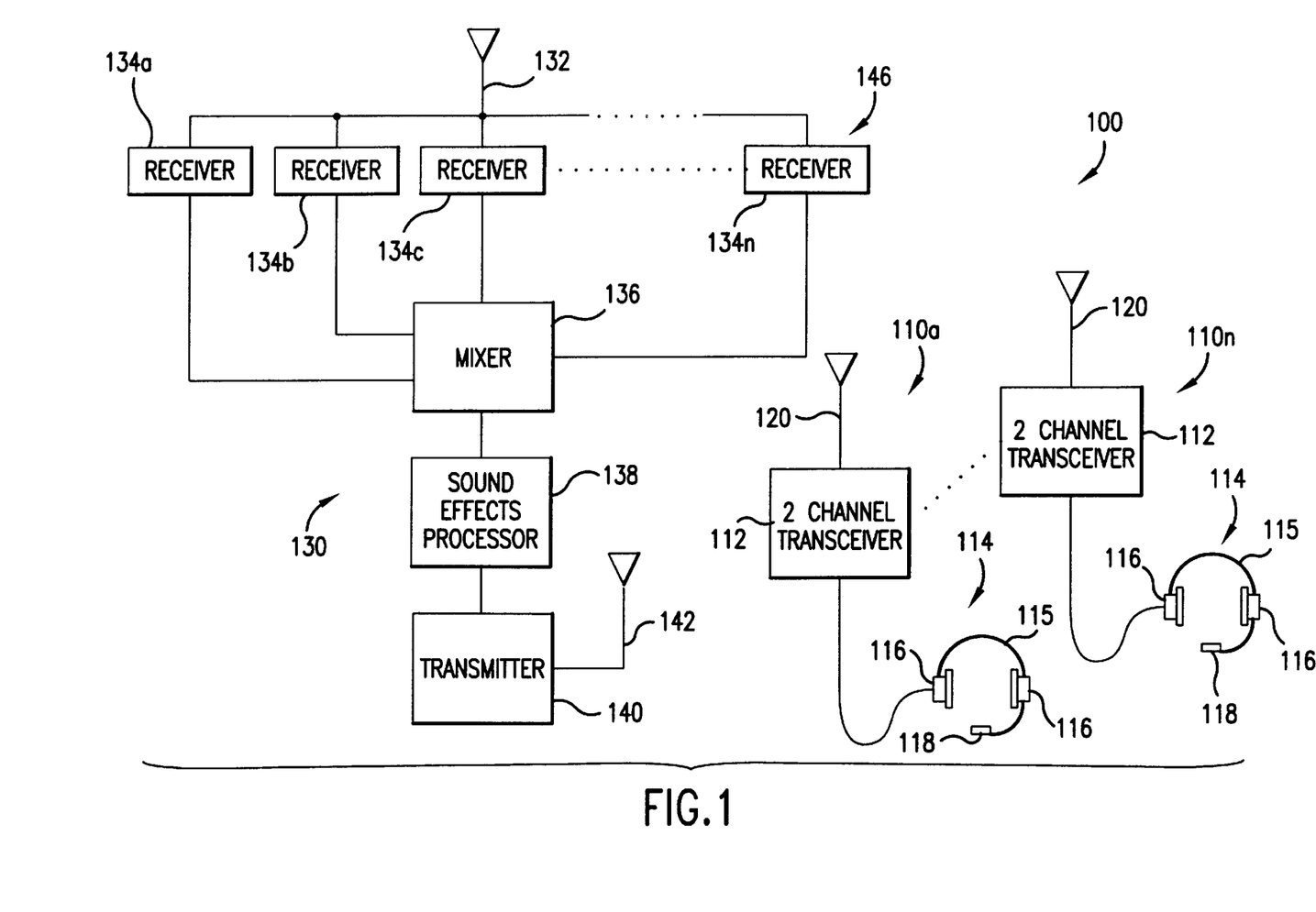
FIG. 1 is a schematic block diagram of the present invention.

Referring now to FIG. 1, there is shown entertainment system 100 for providing audio communication between a plurality of participants. Each of the plurality of participants has at their disposal a respective remote station 110a–100n for providing duplex communication (send and receive). Each of the remote stations include what may be called a two channel transceiver 112, performing transmission and reception functions. Where wireless communications channels are used, the transmit and receive frequencies are different, so that both operations can occur concurrently. The output of transceiver 112 is coupled to an output element 120, which may be one or more antennas, light sensing and emission devices or respective pairs of conductors. Thus, while antennas are schematically represented in the drawings of FIGS. 1–5, it should be understood that such represents any means for coupling signals between any remote station 110 and the signal distribution unit 130, including a public telephone network or a local telephone network. For instance, the two channel transceiver 112 may be formed by a wireless telephone, wherein the plurality of telephone base stations represent the reception channels 134a–134n of the signal distribution unit 130.

Each of the remote stations 110 include at least one audio transducer 116 which is coupled to the receive channel of the transceiver 112 and a microphone 118 coupled to the transmission channel of transceiver 112. One or more audio transducers 116 and the microphone 118 are coupled to a frame 115 adapted to fit the head of a user, to thereby form a headset 114.

Each of the remote stations 110a–110n communicate with a single distribution unit 130 having a plurality of reception channels for respectively receiving the transmitted audio signals, each reception channel 134a–134n receiving signals from a respective one of the plurality of remote stations (chat stations) 110a–110n, through independent conductors, differing frequencies, differing modulation schemes, differing coding schemes, or other techniques for independent transmission of multiple channels. In that manner, each of the audio signals from the plurality of remote stations 110a–110n is independently coupled to a respective reception channel, and provides no direct communication between any of the plurality of remote stations. The reception portion 146 of signal distribution unit 130 may include multiple receivers, each tuned to a respective remote station transmit frequency, or be formed by a single wide band receiver capable of detecting and demodulating a plurality of individual carriers, each carrier being at a distinct frequency. If coding or modulation schemes are being used, multiple decoders or demodulators would be included in reception portion 146. From the reception portion 146, the recovered audio signals from each of the channels 134a–134n are coupled to a mixer 136, each reception channel being coupled to a respective one of a plurality of inputs of the mixer 136. The mixed audio signals are fed from an output of the mixer 136 to an input of a sound effects processor 138. Sound effects processor 138 alters the sound signals input thereto to add such effects as phase shifting, flanging, chorusing, delay, reverberation, stretching, echo, modified pitch, frequency shifting, and may include other effects as well. Sound effects processor 138 may be formed utilizing a microprocessor with real-time audio effects processing software, such as that provided by ANWIDA SOFT, INC., or through the use of commercially available sound effect processors, like those provided from ALESIS STUDIO ELECTRONICS, AXE MUSIC INC., and CHEM USA CORPORATION, for example.

For the scheme shown in FIG. 1, the sound effects processor alters all of the input signals similarly, so that if the sound effects processor is set to emulate the sounds which would represent the participants being in a cave, for example, the voice of each of the participants would be modified in the same way. Obviously, if a particular sound effects processor 138 has been designed for utilization with stereo audio signals, there being two channels available and two different effects can be output from the two channels. Where two channels are utilized, the individual reception channels 134a–134n may be coupled to one of two different mixers, where the output of one mixer feeds the left channel of the sound effects processor 138 and others of the received channels are coupled to a second mixer which provides an output to the right channel of a stereo sound effects processor 138. The two channels of the stereo sound effects processor can then be combined and coupled to the transmission circuit 140, or coupled to separate transmission circuits, as will be described in following paragraphs. For a single channel (monaural) processor 138, the output of the processor is coupled to the transmission circuit 140.

In the simplest case, where there is a single channel sound effects processor coupled between the mixer 136 and the transmission circuit 140, the altered sound signals are communicated from the transmitter circuit 140 to the respective reception channels of all of the remote stations 110a–110n. Where transmission circuit 140 is a radio frequency transmitter circuit, such provides an output to the antenna 142 for wireless transmission to the respective remote station antennas 120. As previously discussed the receive antenna 132 and transmission antenna 142 may be combined in a single antenna depending on the frequencies being utilized, by techniques well known in the art. Further, the transmission and reception can be accomplished through two other wireless techniques, such as use of optical, or acoustic methods, or may be wired, including the use of conventional telephone lines or computer networks.

Figure 2:
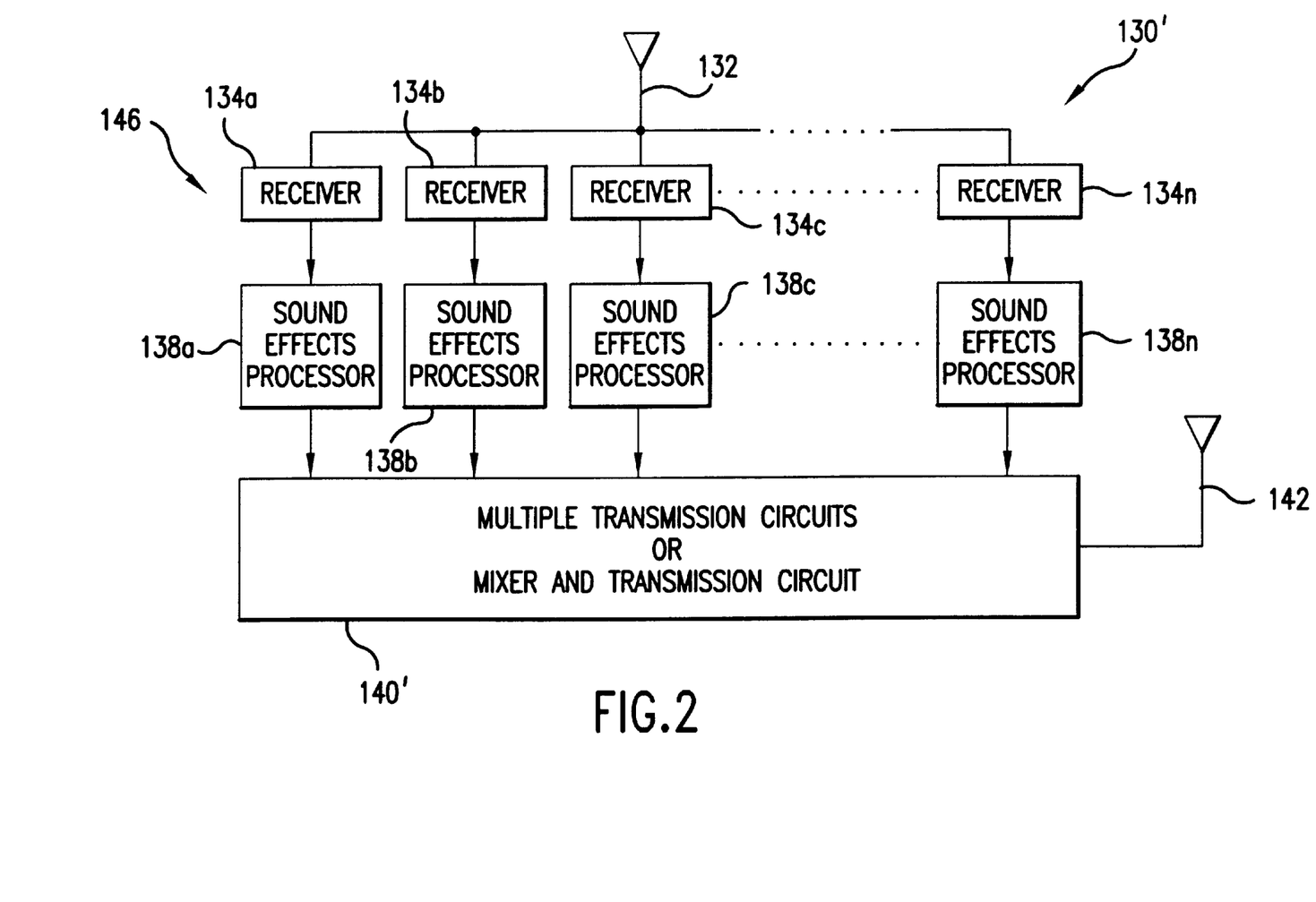
FIG. 2 is a schematic block diagram of an alternative signal distribution unit of the present invention.

Referring now to FIG. 2, there is shown, an alternative signal distribution unit 130' providing further expansion of the stereo sound effect processor concept. In this scheme, the reception portion 146 is identical to that previously discussed, with a plurality of reception channels 134a–134n which may be formed by multiple reception circuits or a single receiver capable of multiple carrier reception and having a plurality of outputs corresponding thereto. The output of each reception channel 134a–134n is coupled to a respective one of a plurality of sound effects processors 138a–138n. In this scheme, each sound effects processor may be set to alter audio signals differently so that the voice of each participant can be altered uniquely. The output from each of the plurality of sound effects processors 138a–138n may be coupled to multiple transmission circuits for transmission over a single transmission channel (reception by all remote stations in common) of each respective processed audio signal through antenna 142, or other type of communications linkage. Alternately, the output from each of the plurality of sound effects processors 138 may be combined in a mixer and then coupled to a transmission circuit for output of the combined altered audio signals, since in this scheme all of the remote stations are intended to receive the altered audio signals from any other remote station.

In place of one or more sound effects processors included as part of the signal distribution unit, a sound effects processor can be incorporated into each of the remote stations, as shown in FIG. 3. Each chat station 110a–110n' includes a microphone 118 having an output coupled to a respective sound effects processor 122. The output of the sound effects processor is coupled to a transmission circuit 112b for output of the altered audio signals. As in the scheme of FIG. 1, the signals from the remote stations can be coupled to a signal distribution unit. However, where there are only two participants to converse in a chat room, a signal distribution unit is unnecessary, as the reception circuit of each remote station would be adapted to receive the output of the transmission circuit of the other.

As shown, coupling of signals between the chat stations and the signal distribution unit may be accomplished utilizing wireless techniques, such as radio frequency signals. Use of optics, sound or hard wiring is to be considered equivalent. As each chat station 110a'–110n' includes a respective sound effects processor, each participant can easily select the particular sound effects by which their voice is altered. As each chat station 110a'–110n' transmits on an individual transmission channel, there is no interference created when multiple participants are speaking at the same time.

Figure 5:
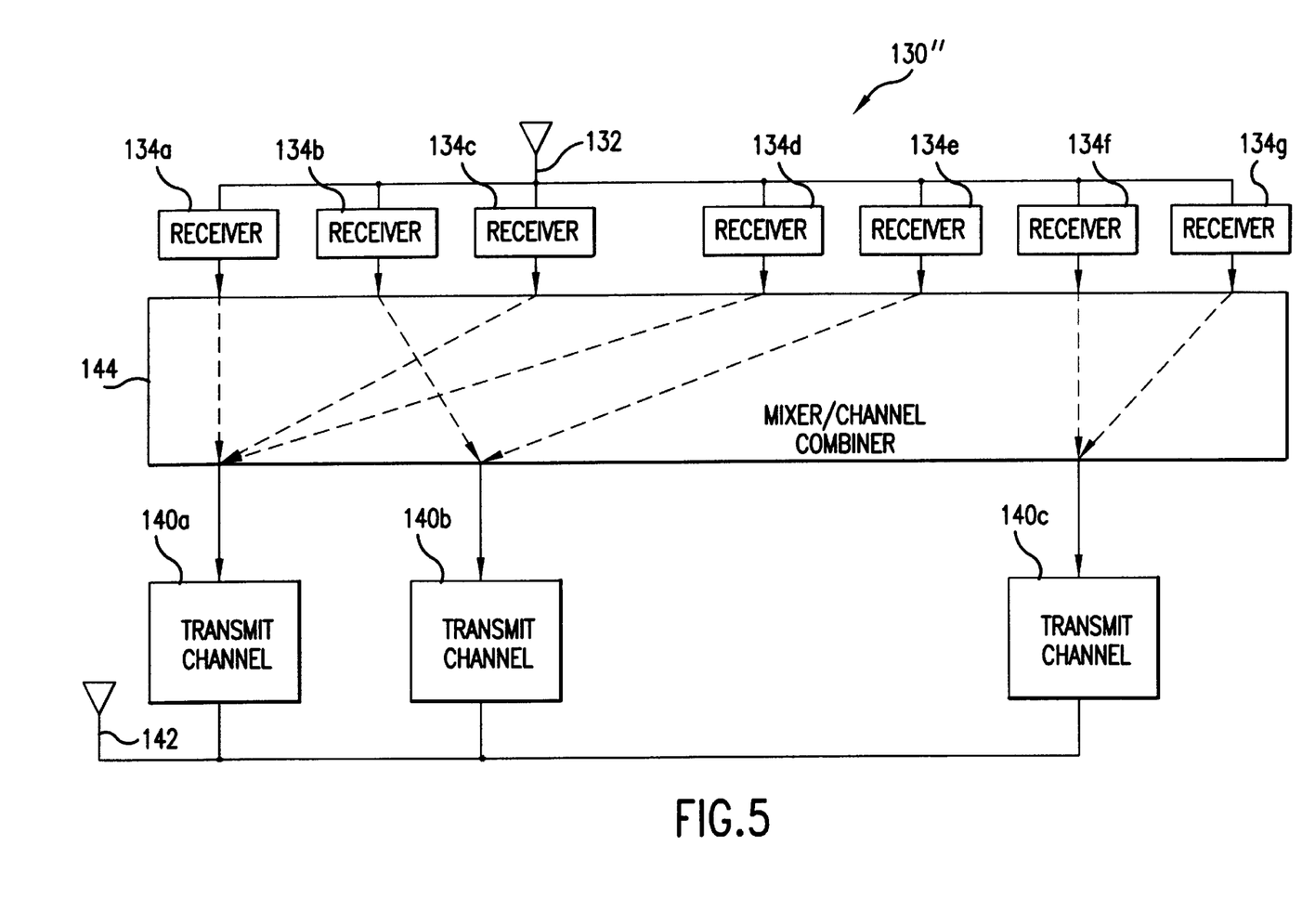

The signal distribution unit 130'' includes the multiple reception channels 134, like that shown in FIG. 1. The output from each of the receivers can be simply mixed, as shown in FIG. 1 or combined to group particular chat stations together, as shown in FIG. 5. Thus, where a simple mixer is utilized, a single transmission circuit 140a is all that would be required to broadcast the combined altered audio signals received from the respective chat stations. Where a channel combiner is included, then multiple transmission circuits 140a–140n can be utilized to provide multiple simultaneous chat rooms. The respective transmission circuits 140a–140n communicate with the receiver 112a of one or more of the respective chat stations. For the radio frequency wireless case, the signal is coupled through an antenna 120a to the receiver 112a of a corresponding remote station. The base band audio signal is coupled from the receiver 112a to one or more audio transducers 116. Audio transducer 116 may be a conventional speaker or headphone. The microphone 118 may be incorporated with the headphones to form headset 114, such as those commonly used for hands-free telephone use that include both a microphone and headphones, or the microphone and audio transducers can be provided separately.

As shown in FIG. 5, the signal distribution unit 130'' incorporates a plurality of reception circuits 134a–134g, as an example. The output of each of the reception circuits 134a–134g are respectively coupled to the mixer/channel combiner 144. The mixer/channel combiner 144 provides the means for selectively mixing particular input channels together at a particular output port. In the particular example illustrated, the output from receiver channels 134a, 134c and 134d are combined and output from a first port to the transmit channel 140a for distribution so that the participants' transmissions of altered voice signals are received by the reception circuits 112a of the respective remote stations. In this manner, a three person chat room is formed. The output from the reception channel 134b and the channel 134e are combined and output from a second port for coupling to a second transmit channel 140b, through the antenna 142, or other transmission means. The transmit channel 140b operates independently of transmit channel 140a so that a second chat room is created between the participants whose altered voice signals are received by the reception circuits 134b and 134e. Reception circuits 134f and 134g are combined and output from a third port for connection to a third independent transmit channel 140c, forming a third chat room. Utilization of a reconfigurable channel combiner allows the number and designation of channels combined for any one chat room to be selected and subsequently changed to add, remove, or move chat room participants.

Figure 4:
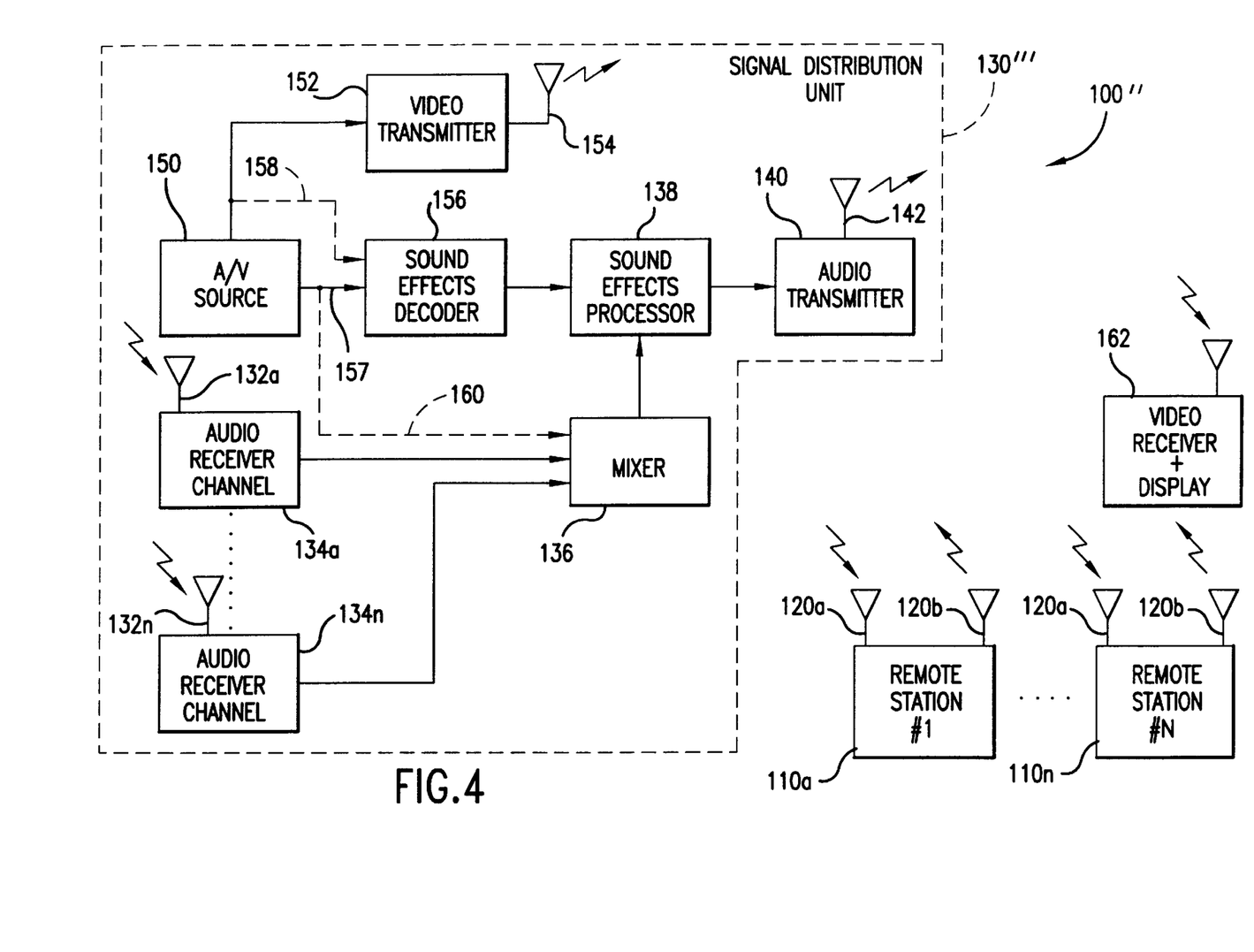
FIG. 4 is a schematic block diagram of yet another configuration of the present invention; and, FIG. 5 is a more detailed schematic block diagram of the signal distribution unit of the embodiment of FIG. 3.

Referring to FIG. 4, there is shown entertainment system 100'' enhanced to incorporate video imaging in combination with the altered audio communication previously discussed. Thus, as in the previously discussed schemes, a plurality of audio signal reception channels 134a–134n are coupled to respective inputs of the mixer 136. The output of mixer 136 provides an input to the sound effects processor 138, which in turn alters the mixed audio signals for output to the audio transmitting circuit 140. For RF wireless transmission, the output of the audio transmission circuit 140 is coupled to an antenna 142. As discussed with respect to FIG. 2, the mixer 136 can be replaced by the use of multiple sound effects processors and a plurality of transmission circuits, or relocated between the output of the plurality of sound effects processors and the audio transmission circuit 140.

In combination with the altered audio chat room systems, previously described, an audio/video source 150 is added to the signal distribution unit 130'''. The video output of the A/V source 150 is coupled to a video transmission circuit 152, that for RF wireless transmission is coupled to the antenna 154. The A/V source 150 has encoded therein control signals for varying the sound effects produced by processor 138. The control signals may be encoded with the video signals or audio signals provided from source 150. The control signals provided by either audio connection 157 or alternately, video connection 158 are recovered by a sound effects decoder 156 which provides an output to the control input of the sound effects processor 138. Where multiple sound effects processors are utilized, the sound effects decoder output can be coupled in parallel to all of the sound effects processors or separate control signals can be coupled to each individually or groups thereof. If audio program material is also being provided, then a coupling line 160 is provided for carrying the output audio signal from the A/V source 150 to the mixer 136, so that the preprogrammed audio program material can be processed along with the voice signals of the participants.

The video information signal may be encoded with the control signals for controlling the sound effects processor. In that case, the connection line 158 is provided in place of connection line 157 to couple the video signals to the sound effects decoder 156, for decoding the signals which are fed to the control input of the sound effects processor. The audio video source 150 may represent a live broadcast, prerecorded program material, utilizing videotape or disc, or be formed by a personal computer having audio and/or video source material.

The video information is communicated to the video receiver and display 162, which may be a television receiver, a computer monitor or other display device. The participants are located within proximity of the receiver 162 so that the particular scenes displayed thereon can be observed. Each of the plurality of participants, utilizing the respective remote stations 110a–110n is able to interact with the video image being displayed. Utilizing such a system, a virtual game world can be created wherein the sound effects of sound effects processor 138 are modified to coordinate with the particular video images being displayed and changed in a predetermined manner. Such a system can provide a virtual world for games such as DUNGEONS AND DRAGONS, allowing the sound effects to be changed and coordinated with images representing different portions of a game's story line.

Therefore, in its broadest concept entertainment system 100, 100', 100" includes a plurality of remote stations 110a–110n. Each of the remote stations includes a microphone 118, a transmit section 112b, a receive section 112a and at least one audio transducer 116 coupled to the output of the receive section. The transmit and receive sections of each remote station may be formed by a respective radio frequency transmitter and a receiver, a transceiver, an optical or sonic transmitter and receiver, or line drivers and line receivers for coupling to connection cables. Receiver 112a and transmitters 112b can be implemented with a wireless telephone, including cellular, or a conventional hard-wired telephone for coupling a particular participant's voice signals to the signal distribution unit.

The signal distribution unit has a plurality of reception channels for receiving the transmission of audio signals from each of the plurality of remote stations, each station transmitting on a different channel, which may be formed utilizing different frequency or phase carriers, different types of modulation, digital encoding or other techniques. The signal distribution unit includes at least one sound effects processor for altering respective audio signals from at least one of the plurality of remote stations. The output of the sound effects processor is coupled to a transmission circuit for output of the altered audio signals to the remote stations.

In an alternate configuration, the sound effects processor is included with each of the remote stations such that the audio signal from the microphone 118 is coupled to a sound effects processor 122, the output of which is communicated to the signal distribution unit 130". Thus, each of the remote stations 110a'–110n' permits each user to independently select the type of sound alteration that they desire for interacting with the other participants, who likewise choose their own type and degree of sound alteration. The various altered sound signals are in a sense collected by the multiple receivers 134 and then coupled to the mixer/channel combiner 144 to provide one or more separate and distinct outputs so that multiple and simultaneous chat rooms or game situations can be realized.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is being claimed is:

1. An entertainment system for audio communication between a plurality of participants, comprising:

a plurality of remote stations, each of said remote stations including (a) a microphone, (b) a transmit section having an input coupled to said microphone for transmission of audio signals input thereto, (c) a receive section, and (d) at least one audio transducer coupled to an output of said receive section for providing an aural output; and, a signal distribution unit having a plurality of reception channels for receiving said transmission of audio signals from each of said plurality of remote stations, said signal distribution unit including at least one sound effects processor for altering respective audio signals from at least one of said plurality of remote stations and a transmission circuit coupled to an output of said sound effects processor for output of said altered audio signals to each of said plurality of remote stations.

2. The entertainment system as recited in claim 1 where said signal distribution unit includes a mixer having a plurality of inputs coupled to said plurality of reception channels and an output coupled to an input of said sound effects processor for combining respective audio signals from said plurality of remote stations, said combined audio signals each being altered in said sound effects processor.

3. The entertainment system as recited in claim 1 where said signal distribution unit includes a plurality of sound effects processors respectively coupled to said plurality of reception channels for individually altering audio signals from said plurality of remote stations, each of said plurality of sound effects processors having a respective output coupled to said transmission circuit for output of said individually altered audio signals to each of said plurality of remote stations.

4. The entertainment system as recited in claim 3 where said signal distribution unit further includes a multiplexer having a plurality of inputs coupled to respective outputs of said plurality of sound effects processors and an output coupled to said transmission circuit for output of said individually altered audio signals to each of said plurality of remote stations.

5. The entertainment system as recited in claim 1 where said signal distribution unit further includes an audio/video source having (a) a video output coupled to a video transmission circuit for coupling video signals to a display device, and (b) an audio output coupled to a said sound effects processor.

6. The entertainment system as recited in claim 5 where said audio output of said audio/video source is mixed with audio signals from said plurality of reception channels for coupling to said sound effects processor.

7. The entertainment system as recited in claim 5 where said signal distribution unit includes a decoder having an input coupled to one of said audio and video outputs of said audio/video source and an output coupled to a control input of said sound effects processor for varying alteration of audio signals coupled to said sound effects processor responsive to decoding of control signals encoded with one of audio or video signals from said audio/video source.

8. The entertainment system as recited in claim 7 where said audio output of said audio/video source is mixed with audio signals from said plurality of reception channels for coupling to said sound effects processor.

9. The entertainment system as recited in claim 1 where said signal distribution unit further includes a source of control signals coupled to a control input of said sound effects processor for varying alteration of audio signals.

10. The entertainment system as recited in claim 9 where said source of control signals includes a source of video signals.

11. The entertainment system as recited in claim 9 where said source of control signals includes a source of audio signals.

12. The entertainment system as recited in claim 9 where said source of control signals includes a source of audio and video signals.

13. An entertainment system for audio communication between a plurality of participants, comprising:

a plurality of remote stations, each of said remote stations including (a) a microphone, (b) a sound effects processor having an input coupled to said microphone for altering audio signals input thereto, (c) a transmit section having an input coupled to an output of said sound effects processor for transmission of said altered audio signals, (d) a receive section, and (d) at least one audio transducer coupled to an output of said receive section for providing an aural output; and, a signal distribution unit having a plurality of reception channels for receiving said transmission of altered audio signals from each of said plurality of remote stations, and a transmission circuit coupled to said plurality of reception channels for communication of at least a portion of said altered audio signals to at least a pair of said remote stations.

14. The entertainment system as recited in claim 13 where said signal distribution unit includes a mixer having a plurality of inputs coupled to said plurality of reception channels and an output coupled to an input of said transmission circuit for combining said altered audio signals from said plurality of remote stations.

15. The entertainment system as recited in claim 13 where said signal distribution unit includes at least one channel combiner coupled to a portion of said plurality of reception channels for coupling said portion of said plurality of reception channels to one of a plurality of output channels.

16. An entertainment system for audio communication between a plurality of participants, comprising:

a plurality of remote stations, each of said remote stations including (a) a microphone, (b) a transmit section having an input coupled to said microphone for transmission of audio signals input thereto, (c) a receive section, and (d) at least one audio transducer coupled to an output of said receive section for providing an aural output; and, an audio alteration unit including:
   (a) a plurality of discrete reception channels for receiving said transmission of audio signals from each of said plurality of remote stations;
   (b) at least one sound effects processor for altering respective audio signals from at least one of said plurality of remote stations;
   (c) a source of program material with control signals encoded therewith;
   (d) a decoder having an input coupled to an output of said source of program material and an output coupled to a control input of said sound effects processor for varying alteration of said respective audio signals coupled to said sound effects processor responsive to said control signals; and,
   (e) at least an audio transmission circuit coupled to said sound effects processor for output of said altered audio signals to said remote stations.

17. The entertainment system as recited in claim 16 where said program material includes video signals.

* * * * *